US009390530B2

(12) United States Patent
Scherling

(10) Patent No.: US 9,390,530 B2
(45) Date of Patent: Jul. 12, 2016

(54) IMAGE STITCHING

(75) Inventor: Herman Scherling, Kokkedal (DK)

(73) Assignee: Nokia Technologies Oy, Espoo (FI)

( * ) Notice: Subject to any disclaimer, the term of this patent is extended or adjusted under 35 U.S.C. 154(b) by 282 days.

(21) Appl. No.: 14/119,469

(22) PCT Filed: May 27, 2011

(86) PCT No.: PCT/IB2011/052318
§ 371 (c)(1),
(2), (4) Date: Nov. 22, 2013

(87) PCT Pub. No.: WO2012/164339
PCT Pub. Date: Dec. 6, 2012

(65) Prior Publication Data
US 2014/0111607 A1  Apr. 24, 2014

(51) Int. Cl.
| H04N 7/00 | (2011.01) |
| H04N 5/228 | (2006.01) |
| H04N 5/232 | (2006.01) |
| G06T 11/60 | (2006.01) |
| G06T 7/00 | (2006.01) |
| H04N 5/262 | (2006.01) |
| G06T 3/40 | (2006.01) |
| G02B 13/06 | (2006.01) |
| G03B 17/17 | (2006.01) |
| G03B 37/04 | (2006.01) |

(52) U.S. Cl.
CPC .............. *G06T 11/60* (2013.01); *G06T 3/4038* (2013.01); *G06T 7/0085* (2013.01); *H04N 5/23238* (2013.01); *H04N 5/2624* (2013.01); *G02B 13/06* (2013.01); *G03B 17/17* (2013.01); *G03B 37/04* (2013.01)

(58) Field of Classification Search
CPC ..... G06T 11/60; G06T 7/0085; G06T 3/4038; H04N 5/23238; H04N 5/2624
USPC ............................................................ 348/36
See application file for complete search history.

(56) References Cited

U.S. PATENT DOCUMENTS

| 6,788,333 | B1 | 9/2004 | Uyttendaele et al. ......... 345/629 |
| 6,930,703 | B1 * | 8/2005 | Hubel .................... G03B 37/04 348/208.16 |
| 7,006,111 | B1 | 2/2006 | Rothrock ...................... 345/629 |
| 7,764,309 | B2 | 7/2010 | Deguchi | |
| 2007/0236595 | A1 | 10/2007 | Pan et al. | |
| 2008/0170803 | A1 | 7/2008 | Forutanpour ................. 382/284 |

(Continued)

FOREIGN PATENT DOCUMENTS

| CN | 1982934 A | 6/2007 |
| CN | 101656840 A | 2/2010 |

(Continued)

*Primary Examiner* — Hee-Yong Kim
(74) *Attorney, Agent, or Firm* — Harrington & Smith

(57) ABSTRACT

An apparatus, a method and a computer program are provided. The method includes analyzing first and second images, the first image being captured by a first image sensor portion and the second image being captured by a second image sensor portion, wherein at least one position on the first and second images, at which the analysis of the first and second images is initiated, depends upon at least one contextual characteristic; determining, from the analysis of the first and second images, an overlapping capture region for the first image sensor portion and the second image sensor portion; and stitching the first and second images together using the overlapping capture region.

36 Claims, 7 Drawing Sheets

(56) References Cited

U.S. PATENT DOCUMENTS

Figure 1:
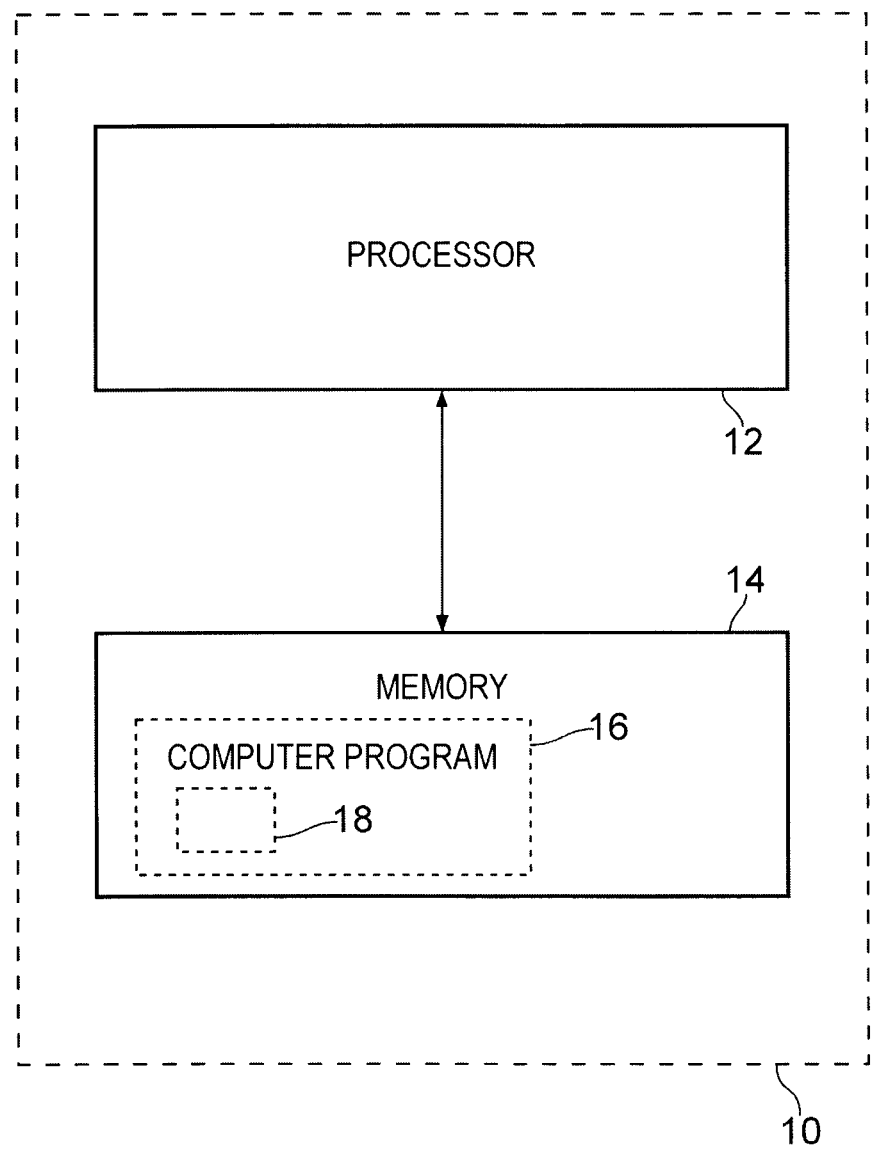

| | | |
|---|---|---|
| 2008/0247667 A1 | 10/2008 | Jin et al. .......................... 382/284 |
| 2009/0051778 A1 | 2/2009 | Pan ............................ 348/218.1 |
| 2010/0194851 A1 | 8/2010 | Pasupaleti et al. ............... 348/36 |
| 2010/0289922 A1 | 11/2010 | Brenner et al. ........... 348/231.99 |
| 2010/0321470 A1 | 12/2010 | Oshima ............................ 348/36 |
| 2011/0141300 A1 | 6/2011 | Stee et al. ................... 348/222.1 |
| 2011/0317937 A1 | 12/2011 | Narusawa ..................... 382/294 |

FOREIGN PATENT DOCUMENTS

| | | |
|---|---|---|
| EP | 2 017 783 A2 | 1/2009 |
| WO | WO 2005/050567 A1 | 6/2005 |
| WO | WO-2007/129147 A1 | 11/2007 |

\* cited by examiner

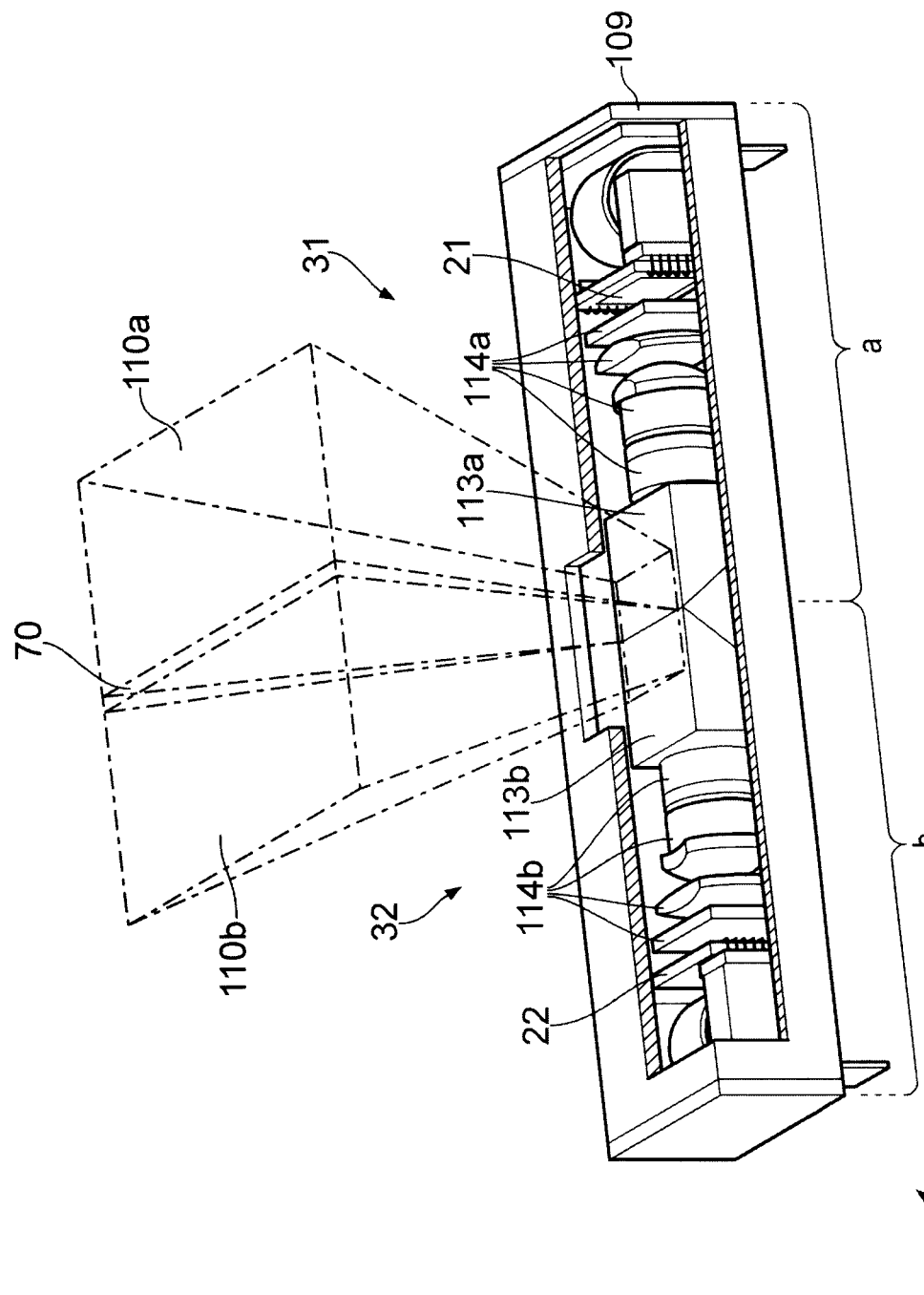

FIG. 4

IMAGE STITCHING

TECHNOLOGICAL FIELD

Embodiments of the present invention relate to image stitching. In particular, they relate to processing images for stitching.

BACKGROUND

Image stitching is a process of combining multiple images with overlapping fields of view to produce a larger image (for example, a panoramic image).

BRIEF SUMMARY

According to some, but not necessarily all, embodiments of the invention, there is provided a method, comprising: analyzing first and second images, the first image being captured by a first image sensor portion and the second image being captured by a second image sensor portion, wherein at least one position on the first and second images, at which the analysis of the first and second images is initiated, depends upon at least one contextual characteristic; determining, from the analysis of the first and second images, an overlapping capture region for the first image portion and the second image portion; and stitching the first and second images together using the overlapping capture region.

According to some, but not necessarily all, embodiments of the invention, there is provided an apparatus, comprising: at least one processor; and at least one memory storing a computer program comprising instructions configured to, working with the at least one processor, cause the apparatus to perform at least the following: analyzing first and second images, the first image being captured by a first image sensor portion and the second image being captured by a second image sensor portion, wherein at least one position on the first and second images, at which the analysis of the first and second images is initiated, depends upon at least one contextual characteristic;

determining, from the analysis of the first and second images, an overlapping capture region for the first image sensor portion and the second image sensor portion; and stitching the first and second images together using the overlapping capture region.

According to some, but not necessarily all, embodiments of the invention, there is provided an apparatus, comprising: means for analyzing first and second images, the first image being captured by a first image sensor portion and the second image being captured by a second image sensor portion, wherein at least one position on the first and second images, at which the analysis of the first and second images is initiated, depends upon at least one contextual characteristic; means for determining, from the analysis of the first and second images, an overlapping capture region for the first image sensor portion and the second image sensor portion; and means for stitching the first and second images together using the overlapping capture region.

According to some, but not necessarily all, embodiments of the invention, there is provided a non-transitory computer readable medium storing a computer program comprising instructions configured to, working with at least one processor, cause at least the following to be performed: analyzing first and second images, the first image being captured by a first image sensor portion and the second image being captured by a second image sensor portion, wherein at least one position on the first and second images, at which the analysis of the first and second images is initiated depends upon at least one contextual characteristic; determining, from the analysis of the first and second images, an overlapping capture region for the first image sensor portion and the second image sensor portion; and stitching the first and second images together using the overlapping capture region.

According to some, but not necessarily all, embodiments of the invention, there is provided a method, comprising: analyzing one or more sets of images, wherein a set of images comprises a first image captured by a first image sensor portion and a second image captured by a second image sensor portion; determining, from the analysis, an overlapping capture region for the first image sensor portion and the second image sensor portion; analyzing third and fourth images in dependence upon the overlapping capture region determined from the analysis of the one or more sets of images, the third image being captured by the first image sensor portion and the fourth image being captured by the second image sensor portion;

determining, from the analysis of the third and fourth images, a further overlapping capture region for the first image sensor portion and the second image sensor portion; and stitching the third and fourth images together using the further overlapping capture region.

According to some, but not necessarily all, embodiments of the invention, there is provided an apparatus, comprising: means for analyzing one or more sets of images, wherein a set of images comprises a first image captured by a first image sensor portion and a second image captured by a second image sensor portion; means for determining, from the analysis, an overlapping capture region for the first image sensor portion and the second image sensor portion; means for analyzing third and fourth images in dependence upon the overlapping capture region determined from the analysis of the one or more sets of images, the third image being captured by the first image sensor portion and the fourth image being captured by the second image sensor portion; means for determining, from the analysis of the third and fourth images, a further overlapping capture region for the first image sensor portion and the second image sensor portion; and means for stitching the third and fourth images together using the further overlapping capture region.

According to some, but not necessarily all, embodiments of the invention, there is provided an apparatus, comprising: at least one processor; and at least one memory storing a computer program comprising instructions configured to, working with the at least one processor, cause the apparatus to perform at least the following: analyzing one or more sets of images, wherein a set of images comprises a first image captured by a first image sensor portion and a second image captured by a second image sensor portion; determining, from the analysis, an overlapping capture region for the first image sensor portion and the second image sensor portion; analyzing third and fourth images in dependence upon the overlapping capture region determined from the analysis of the one or more sets of images, the third image being captured by the first image sensor portion and the fourth image being captured by the second image sensor portion; determining, from the analysis of the third and fourth images, a further overlapping capture region for the first image sensor portion and the second image sensor portion; and stitching the third and fourth images together using the further overlapping capture region.

According to some, but not necessarily all, embodiments of the invention, there is provided a non-transitory computer readable medium storing a computer program comprising instructions configured to, working with at least one processor, cause at least the following to be performed: analyzing one or more sets of images, wherein a set of images comprises a first image captured by a first image sensor portion and a second image captured by a second image sensor portion; determining, from the analysis, an overlapping capture region for the first image sensor portion and the second image sensor portion; analyzing third and fourth images in dependence upon the overlapping capture region determined from the analysis of the one or more sets of images, the third image being captured by the first image sensor portion and the fourth image being captured by the second image sensor portion; determining, from the analysis of the third and fourth images, a further overlapping capture region for the first image sensor portion and the second image sensor portion; and stitching the third and fourth images together using the further overlapping capture region.

According to some, but not necessarily all, embodiments of the invention, there is provided a method, comprising: analyzing first and second images, the first image being captured by a first image sensor portion and the second image being captured by a second image sensor portion; determining, from the analysis of the first and second images, an overlapping capture region for the first image portion and the second image portion; and stitching the first and second images together using the overlapping capture region.

According to some, but not necessarily all, embodiments of the invention, there is provided an apparatus, comprising: at least one processor; and at least one memory storing a computer program comprising instructions configured to, working with the at least one processor, cause the apparatus to perform at least the following: analyzing first and second images, the first image being captured by a first image sensor portion and the second image being captured by a second image sensor portion; determining, from the analysis of the first and second images, an overlapping capture region for the first image sensor portion and the second image sensor portion; and stitching the first and second images together using the overlapping capture region.

According to some, but not necessarily all, embodiments of the invention, there is provided an apparatus, comprising: means for analyzing first and second images, the first image being captured by a first image sensor portion and the second image being captured by a second image sensor portion; means for determining, from the analysis of the first and second images, an overlapping capture region for the first image sensor portion and the second image sensor portion; and means for stitching the first and second images together using the overlapping capture region.

According to some, but not necessarily all, embodiments of the invention, there is provided a non-transitory computer readable medium storing a computer program comprising instructions configured to, working with at least one processor, cause at least the following to be performed: analyzing first and second images, the first image being captured by a first image sensor portion and the second image being captured by a second image sensor portion; determining, from the analysis of the first and second images, an overlapping capture region for the first image sensor portion and the second image sensor portion; and stitching the first and second images together using the overlapping capture region.

BRIEF DESCRIPTION

Figure 2:
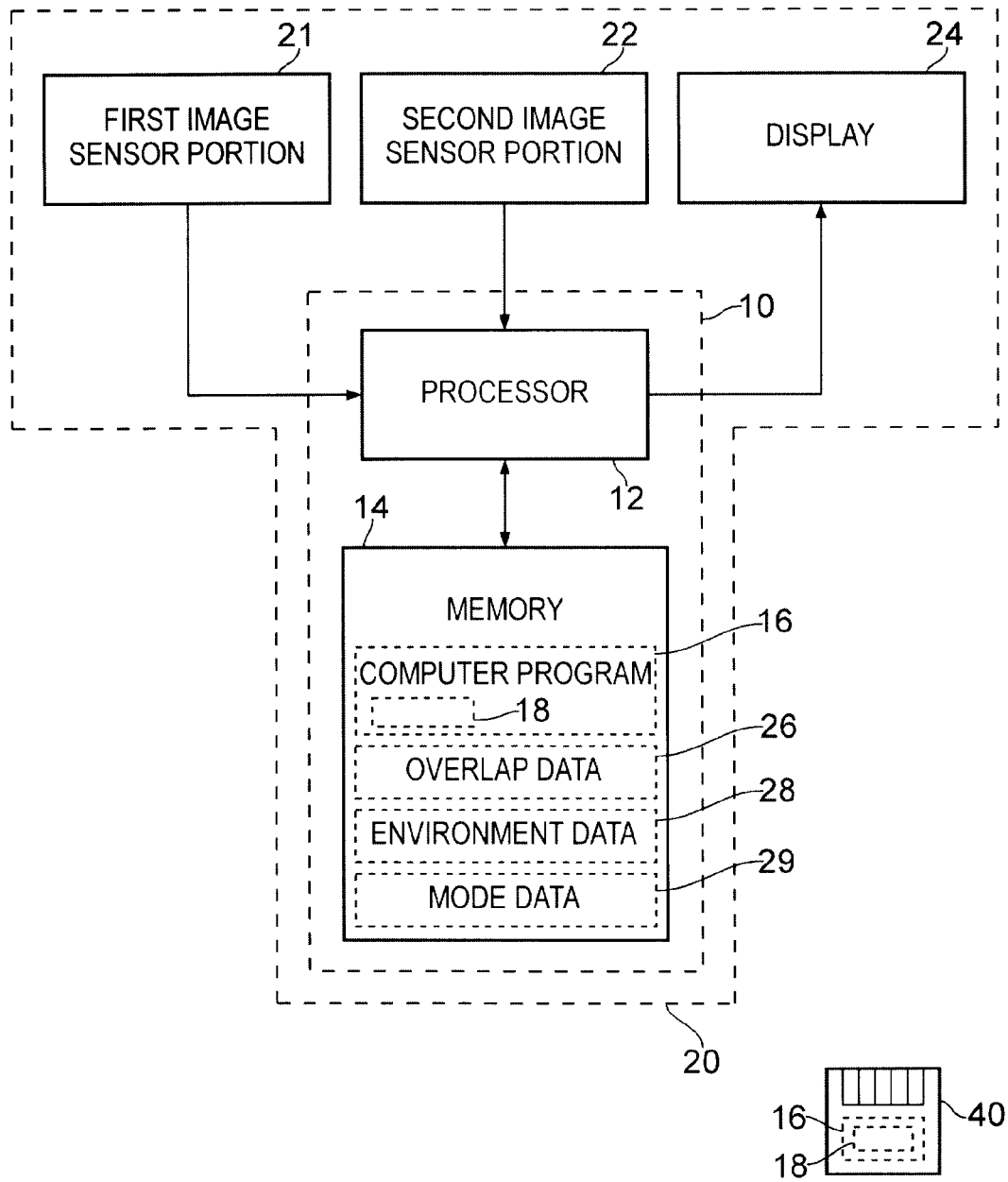
Figure 3B:
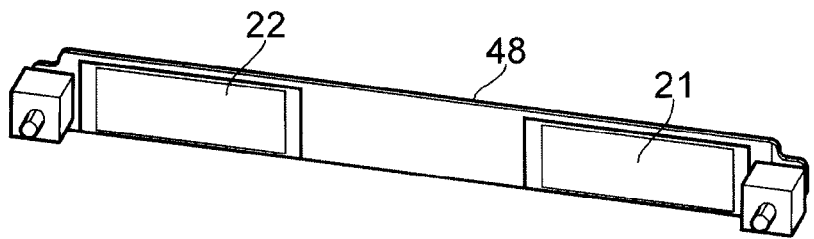
Figure 3C:
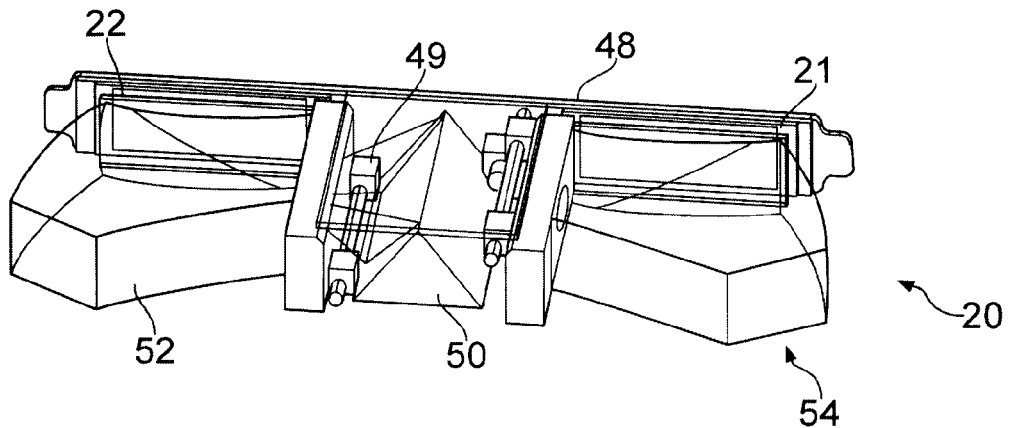
Figure 3D:
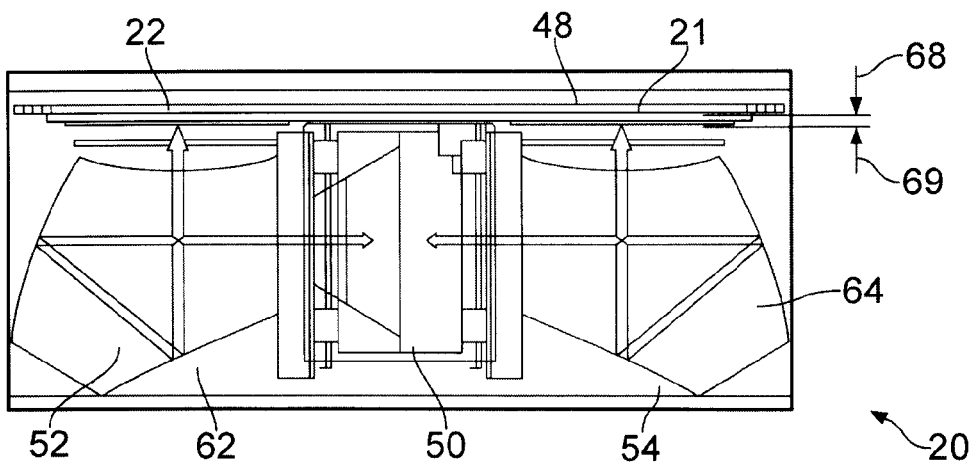
Figure 5:
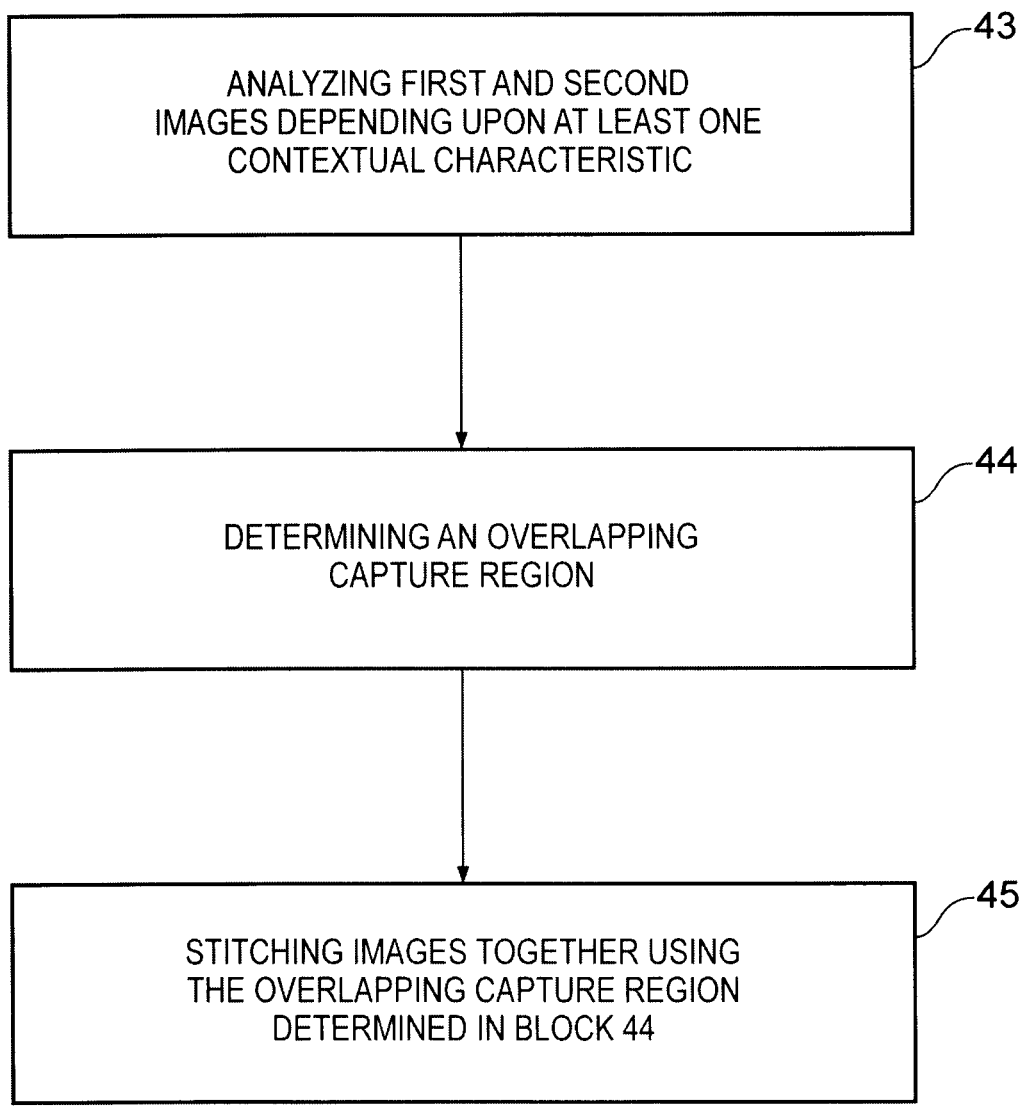
Figure 6:
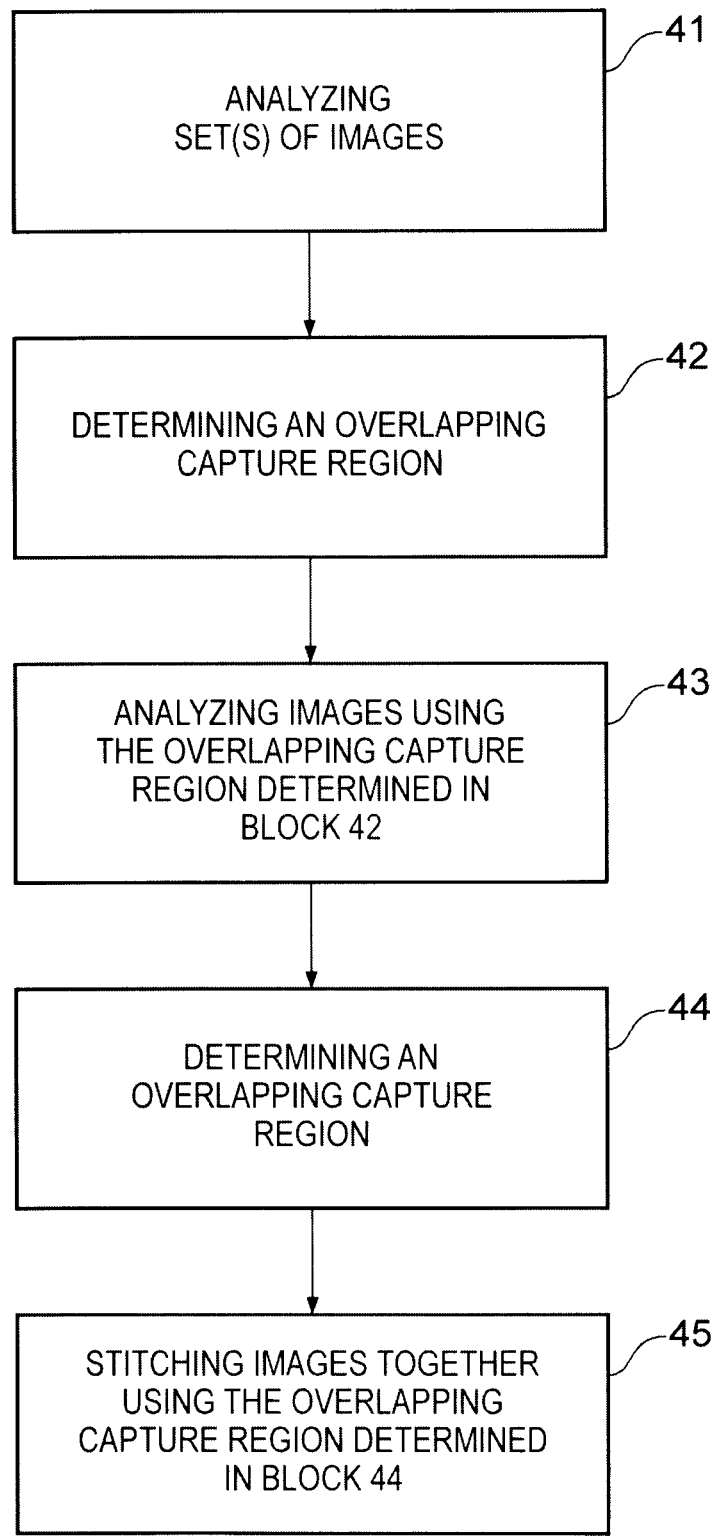

For a better understanding of various examples of embodiments of the present invention reference will now be made by way of example only to the accompanying drawings in which:

FIG. 1 illustrates a schematic of an apparatus;
FIG. 2 illustrates a schematic of a further apparatus;
FIG. 3A illustrates a perspective cross-sectional view of a first example of the further apparatus;
FIG. 3B illustrates a first and second image sensor portions for use in a second example of the further apparatus;
FIGS. 3C and 3D illustrate the second example of the further apparatus;
FIG. 4 illustrates first and second image sensors;
FIG. 5 illustrates a flow chart of a first method; and
FIG. 6 illustrates a flow chart of a second method.

DETAILED DESCRIPTION

Embodiments of the invention relate to image stitching. Embodiments of the invention may, for example, enable relatively fast image stitching. This may be particularly advantageously for a camera in viewfinder or video recording mode that is providing/recording a panoramic video image which comprises multiple frames per second (for instance, 30 frames per second).

The figures illustrate an apparatus 10/20, comprising: at least one processor 12; and at least one memory 14 storing a computer program 16 comprising instructions 18 configured to, working with the at least one processor 12, cause the apparatus 10/20 to perform at least the following: analyzing first and second images, the first image being captured by a first image sensor portion 21 and the second image being captured by a second image sensor portion 22, wherein at least one position on the first and second images, at which the analysis of the first and second images is initiated, depends upon at least one contextual characteristic; determining, from the analysis of the first and second images, an overlapping capture region for the first image sensor portion 21 and the second image sensor portion 22; and stitching the first and second images together using the overlapping capture region.

FIG. 1 illustrates an apparatus 10 comprising at least one processor 12 and at least one memory 14. The apparatus 10 may, for example, be a chip or a chipset. Although a single processor 12 and a single memory 14 are illustrated in FIG. 1, in some implementations of the invention more than one processor 12 and/or more than one memory 14 is provided.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components some or all of which may be integrated/removable and/or may provide permanent/semi-permanent/dynamic/cached storage.

The memory 14 stores a computer program 16 comprising computer program instructions 18 that control the operation of the apparatus 10 when loaded into the processor 12. The computer program instructions 18 provide the logic and routines that enables the apparatus 10/20 to perform the methods illustrated in FIGS. 5 and 6. The processor 12 by reading the memory 14 is able to load and execute the computer program 16.

The computer program 16 may arrive at the apparatus 10/20 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 16. The delivery mechanism 40 may be a signal configured to reliably transfer the computer program 16. The apparatus 10/20 may propagate or transmit the computer program 16 as a computer data signal.

FIG. 2 illustrates a further apparatus 20. The apparatus 20 may, for example, be a camera. In some embodiments of the invention, the apparatus 20 may be hand portable and may have further functionality. For example, the apparatus 20 may be configured to operate as a mobile telephone, a tablet computer, a games console and/or a portable music player.

The apparatus 20 illustrated in FIG. 2 comprises a first image sensor portion 21, a second image sensor portion 22, a display 24 and the apparatus 10 illustrated in FIG. 1. The elements 12, 14, 21, 22 and 24 are operationally coupled and any number or combination of intervening elements can exist (including no intervening elements)

In some embodiments, the first image sensor portion 21 and second image sensor portion 22 are separate image sensors. In other embodiments, the first image sensor portion 21 and the second image sensor portion 22 are different portions of a single image sensor.

Each of the image sensor portions 21, 22 is configured to convert an optical image into an electrical signal. The image sensor portions 21, 22 may be any type of image sensor portions. For example, in some implementations, they may be charge coupled devices (CCD) or complementary metal-oxide-semiconductor (CMOS) sensor portions.

The apparatus 20 may further comprise at least one optical arrangement that is configured to convey light to the image sensor portions 21, 22 to enable them to capture images. The image sensor portions 21, 22 and/or the optical arrangement (s) are arranged such that the image sensor portions 21, 22 have a partially overlapping field of view. That is, when the image sensor portions 21, 22 capture images substantially simultaneously, some but not all of the content in the image captured by the first image sensor portion 21 will be present in the image captured by the second image sensor portion 22, and vice-versa.

The display 24 is configured to display images captured by the first and second image sensor portions 21, 22. The display 24 may be any type of display. For example, the display 24 may be a liquid crystal display (LCD) or an organic light emitting diode (OLED) display. In some embodiments, the display 24 is a touch sensitive display that is configured to receive user input.

In FIG. 2, the memory 14 is illustrated as storing overlap data 24, environment data 28 and mode data 29. This will be described in further detail below.

FIG. 3A illustrates a perspective cross sectional view of one example of a portion of the apparatus 20. In this example, the first and second image sensor portions 21, 22 are separate image sensors. The apparatus 20 includes a housing 109 that houses the first and second image sensor portions 21, 22 and two optical arrangements 31, 32. The portion of the apparatus 20 illustrated in FIG. 3 can be considered to be in two parts a, b.

The first part a includes the first image sensor portion 21 and the first optical arrangement 31. In this example, the first optical arrangement 31 comprises a prism 113a and a plurality of lenses 114a. The second part b includes the second image sensor portion 22 and the second optical arrangement 32. In this example, the second optical arrangement 32 comprises a prism 113b and a plurality of lenses 114b.

In operation, light is bent by the prism 113a and conveyed to the first image sensor portion 21 by the lenses 114b. Similarly, light is bent by the prism 113b and conveyed to the second image sensor portion 22 by the lenses 114b.

FIG. 3A illustrates a first viewing cone 110a that represents the field of view of the first image sensor portion 21 and a second viewing cone 110b that represents the field of view of the second image sensor portion 22. The fields of view of the first and second image sensor portions 21, 22 overlap. The volume of overlap is designated by the reference numeral 70 in FIG. 3, and means that when images are captured substantially simultaneously by the first and second image sensor portions 21, 22, some of the same image data (that is, the same image content) will be captured by both the first image sensor portion 21 and the second image sensor portion 22.

FIGS. 3B to 3D illustrate a different example of the apparatus 20 to that shown in FIG. 3A. FIG. 3B illustrates a first image sensor portion 21 and a second image sensor portion 22 mounted on a printed wiring board 48. In the illustrated example, the first and second image sensor portions 21, 22 are different image sensors. However, in some embodiments, the first and second image sensor portions 21, 22 are different portions of a single image sensor.

FIGS. 3C and 3D illustrate the first and second image sensor portions 21 and 22 in position within the apparatus 20. Light enters the apparatus 20 through one or more apertures in a housing of the apparatus 20 and is directed by a prism/mirror 50 to first and second optical devices 52, 54. The optical devices 52, 54 are substantially shaped as pentaprisms 52, 54. Each optical device 52, 54 has an upper surface, a lower surface and five sides. Each optical device 52, 54 changes the direction of incident light through substantially 90° and directs it towards its respective image sensor portion 21, 22. This is illustrated by the light rays 62, 64 in FIG. 3D. Each optical device 52, 54 also focuses light upon the image sensor portions 21, 22.

The image sensor portions 21, 22 and the printed wiring board 48 may be movable by a mechanism 49 for image focusing. The arrows 68, 69 indicate the extent of movement of the image sensor portions 21, 22 and the printed wiring board 48.

Although not explicitly shown in FIGS. 3B to 3D, the image sensor portions 21, 22 in the FIG. 3B-3D example have the same overlapping field of view as that described above in relation to the FIG. 3A example.

In both the FIG. 3A and the FIG. 3B-3D examples, the first and second image sensor portions 21, 22 can be considered to have an "overlapping capture region" which includes a subset of the pixels of the first image sensor portion 21 and a subset of the pixels of the second image sensor portion 22. For example, the overlapping capture region may include: i) some, but not necessarily all, of the pixels of the first image sensor portion 21 that are used to capture image content which is also captured by the second image sensor portion 22, and ii) some, but not necessarily all, of the pixels of the second image sensor portion 22 which are used to capture image content that is also captured by the first image sensor portion 21.

Figure 4:
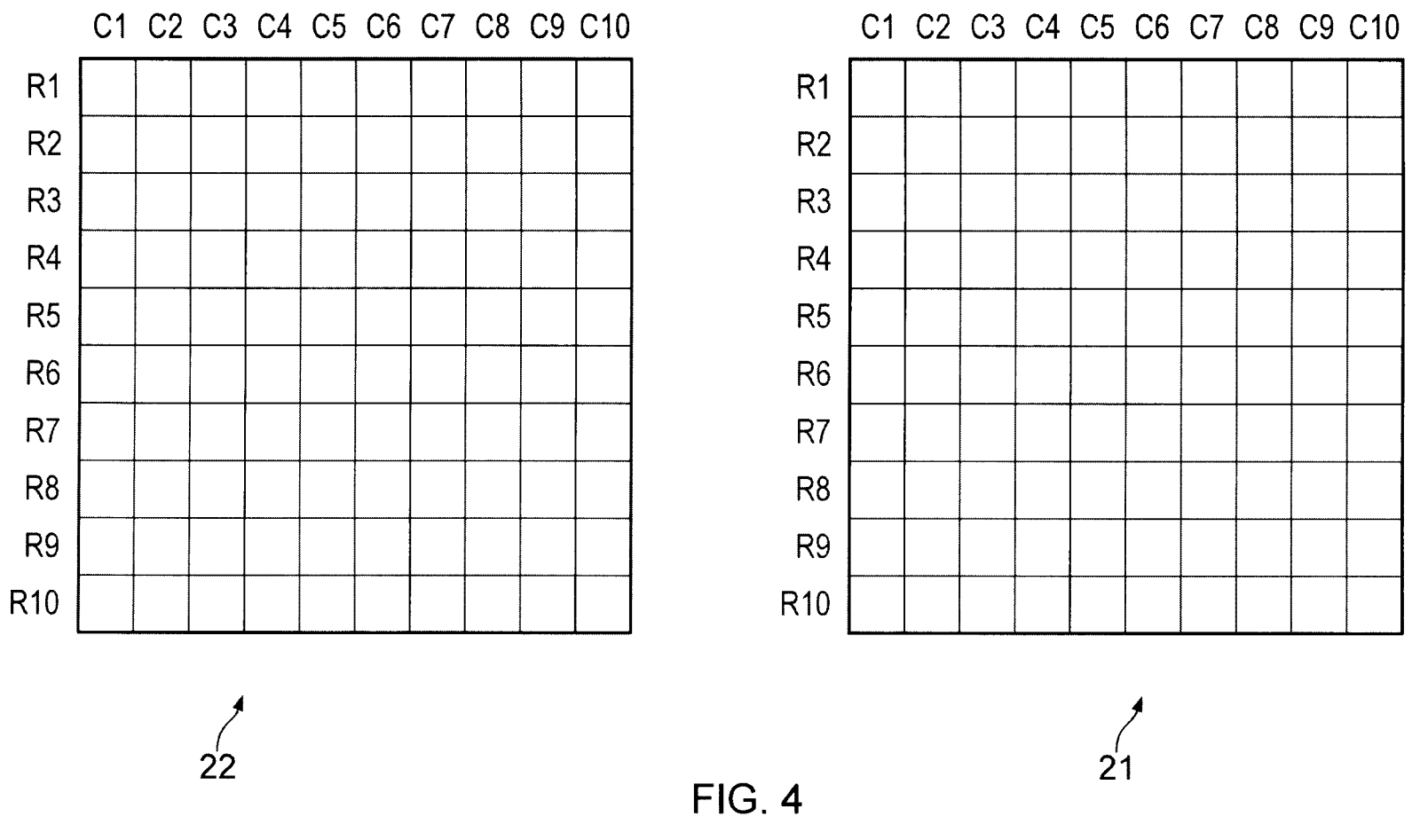

FIG. 4 illustrates an example of a schematic of the first and second image sensor portions 21, 22. In this example, each of the first and second image sensor portions 21, 22 comprises ten columns C1-C10 and ten rows R1-R10 of pixels. An overlapping capture region could, by way of example, comprise columns C1 and C2 of the first image sensor portion 21 and columns C9 and C10 of the second image sensor portion 22.

Data indicating a theoretical overlapping capture region may be stored in overlap data 26 in the memory 14 of the apparatus 10/20. The theoretical overlapping capture region may indicate, for particular theoretical circumstances, pixels of the first image sensor portion 21 and the second image sensor portion 22 that are expected to be used to capture to image content that is present in both the first and second images.

The actual overlapping capture region may, however, vary from the theoretical overlapping capture region depending upon one or more contextual characteristics. That is, the actual overlapping capture region can vary in dependence upon the context in which images are captured by the apparatus 20. The one or more contextual characteristic(s) may be time variable.

The contextual characteristic(s) could relate to the surrounding environment of the apparatus 20. For example, the contextual characteristic(s) could include ambient temperature and ambient pressure. A change in ambient temperature may cause thermal expansion of components of the apparatus 20 and a change in the overlapping capture region. A change in pressure could also cause a change in the overlapping capture region.

The contextual characteristic(s) could include or relate to the operational mode of the apparatus 20. For example, changes to capture resolution, focal length and image stabilization could cause the overlapping capture region to change.

In some embodiments, the apparatus 20 may have a fixed capture resolution and/or a fixed focal length and may not have image stabilization. Nevertheless, changes to one or more contextual characteristics such as ambient temperature and/or pressure may cause the overlapping capture region to change.

FIGS. 5 and 6 illustrate flow charts in accordance with embodiments of the invention. A first group of embodiments of the invention will now be described with reference to FIG. 5.

In this group of embodiments, the memory 14 stores a look up table that indicates how the overlapping capture region is expected to vary in dependence upon one or more contextual characteristics. For example, multiple different overlapping capture regions may be stored in the overlap data 26, each of which is associated with different environmental characteristics (for example, different temperatures and/or pressures) stored in the environment data 28 and/or different operational modes (for example, capture resolutions, focal lengths and image stabilization positions/states) in the mode data 29.

The look up table might, for example, be based on theoretical calculations or empirical data determined post-manufacture. The different overlapping capture regions stored in the look up table can be considered to be data that varies with the contextual characteristic(s).

At block 43 of FIG. 5, the processor 12 analyzes a first image captured by the first image sensor portion 21 and a second image captured by the second image sensor portion 22. At least one position on the first and second images at which the analysis of the first and second images is initiated depends upon at least one contextual characteristic.

The analysis performed by the processor 12 is an image registration process in which the processor 12 compares the first image with the second image to determine content that is present in both images. The analysis performed by the processor 12 may, for example, comprise comparing the sum of the absolute differences between data in the first image and data in the second image.

The purpose of the analysis is to enable the processor 12 to stitch the first and second images together accurately to create a larger image (such as a panoramic image).

Before, after or during the capture of the first and second images, the processor 12 may, for example, determine one or more current contextual characteristics (using inputs from an appropriate sensor) such as the current temperature, the current atmospheric pressure, the current capture resolution, the current focal length and/or the current state/position of the image stabilization. The processor 12 may then compare that information with the stored environment data 28 and/or the stored mode data 29 to retrieve an associated stored overlapping capture region from the overlap data 26.

The processor 12 analyzes the first and second images in block 43 of FIG. 5 using the stored overlapping capture region retrieved from the overlap data 26 in the memory 14. The stored overlapping capture region indicates where the actual overlapping capture region is expected to be, given the apparatus characteristic(s) that has/have been sensed.

The processor 12 may, for example, initiate its analysis at a position on each of the first and second images that corresponds with a pixel regions which, from the stored overlapping capture region, is expected to include content that is also present in the other image. That is, the processor 12 may use the stored overlapping capture region as a "starting point" for analyzing the first and second images to determine an empirical/actual overlapping capture region for use in stitching the first and second images together.

At block 44 of FIG. 5, the processor 12 determines an actual/empirical overlapping capture region for the first image sensor portion 21 and the second image sensor portion 22, from its analysis of the first and second images.

The empirical overlapping capture region may comprise a first plurality of pixels of the first image sensor portion 21 and a second plurality of pixels of the second image sensor portion 22. It will be appreciated by those skilled in the art that an empirically determined capture region may not be rectilinear or may not have a rectilinear edge. It could, for example, be a jagged line on an image sensor portion 21, 22 or be a larger area on an image sensor portion 21, 22 with a jagged edge.

At block 45 of FIG. 5, the processor 12 stitches the first and second images together using the actual/empirical overlapping capture region determined in block 44 of FIG. 5 to create a larger image (such as a panoramic image). The processor 12 may, for example, control the display 24 to display the created image.

The embodiments of the invention described above enable the processor 12 to align and stitch images together quickly. This is particularly advantageous when the apparatus 20 is a camera in viewfinder or video recording mode, where multiple images are being stitched and displayed every second.

A second group of embodiments of the invention will now be described with reference to FIG. 6.

In this example, a user provides user input that causes the processor 12 to control the first image sensor portion 21 to capture a first image and the second image sensor 22 to capture a second image. The first and second images may be captured substantially simultaneously, and can be considered to be a "set of images".

At block 41 of FIG. 6, the processor 12 analyzes the set of images captured by the first and second image sensor portions 21, 22 in order to determine an "overlapping capture region" for the first and second image sensor portions 21, 22, in respect of the first and second images, to enable the processor 12 to stitch the first and second images together accurately to create a larger image (such as a panoramic image).

The analysis performed by the processor 12 is an image registration process in which the processor 12 compares the first image with the second image to determine content that is present in both images. The analysis performed by the processor 12 may, for example, comprise comparing the sum of the absolute differences between data in the first image and data in the second image.

The processor 12 may use the overlap data 26 stored in the memory to perform the analysis. For example, the overlap data 26 stored in the memory 14 may comprise data that indicates the theoretical overlapping capture region for the first image sensor portion 21 and the second image sensor portion 22.

The processor 12 may use this information by initiating its analysis in block 41 of FIG. 6 at positions on the first and second images that correspond with pixels in the theoretical overlapping capture region, to determine content that is present in both the first image and the second image. That is, the processor 12 uses the theoretical overlapping capture region as a "starting point" for analyzing the first and second images to determine an empirical overlapping capture region for use in stitching the first and second images together.

At block 42 of FIG. 6, the processor 12 determines, from its analysis of the first and second images, an empirical overlapping capture region for the first image sensor portion 21 and the second image sensor portion 22. The overlapping capture region may be stored, at least temporarily, as part of the overlap data 26 in the memory 14.

In some circumstances, an overlapping capture region that has been empirically determined at block 42 of FIG. 6 as described above can be considered to depend upon at least one contextual characteristic. For instance, an empirically determined overlapping capture region may vary in dependence upon current environmental characteristics (for example, temperature and/or pressure) and/or the current operational mode (for example, capture resolution, focal length and image stabilization state/position) of the apparatus 20 when the first and second images are captured, for the reasons given above.

The overlapping capture region determined in block 42 of FIG. 6 enables the processor 12 to align the first image with the second image and stitch them together accurately to create a larger image (such as a panoramic image). The processor 12 may, for example, control the display 24 to display the created image.

Before, during or after the overlapping capture region for the first and second image sensor portions 21, 22 has been determined in block 42 of FIG. 6, the first image sensor portion 21 and the second image sensor portion 22 may be used to capture third and fourth images respectively.

At block 43 of FIG. 6, the processor 12 analyzes the third and fourth images in dependence upon the overlapping capture region determined in the analysis at block 42 of FIG. 6 and stored in the overlap data 26.

The analysis is performed in order to determine a further overlapping capture region for first and second image sensor portions 21, 22, in respect of the third and fourth images, to enable the processor 12 to stitch the third and fourth images together accurately to create a larger image (such as a panoramic image).

The analysis performed by the processor 12 may be the same image registration process described above in relation to the first and second images, but in this instance for the third and fourth images. For example, the processor 12 may compare the third and fourth images to determine content that is present in both images.

The processor 12 may, for example, initiate its analysis at a position that depends upon the overlapping capture region determined in block 42 of FIG. 6. That is, the processor 12 may begin by analyzing areas of the third and fourth images that correspond with pixels in the previously determined empirical overlapping capture region, to determine content that is present in the both the third image and the fourth image. The previously determined empirical overlapping capture region therefore provides a "starting point" for analyzing the first and second images to determine a further empirical overlapping capture region for use in stitching the third and fourth images together.

Use of the previously determined empirical overlapping capture region in analyzing the third and fourth images advantageously enables the processor 12 to determine the further empirical overlapping capture region quickly, because any change from the overlapping capture region is likely to be relatively small.

It will be appreciated by those skilled in the art that the analysis of the third and fourth images in block 43 of FIG. 6 can, in some circumstances, be considered to depend upon at least one contextual characteristic. This is because the previously determined empirical overlapping capture region that is used to analyze the third and fourth images may depend on at least one contextual characteristic.

At block 44 of FIG. 6, the processor 12 determines a further empirical overlapping capture region and, in block 45, it uses the further empirically determined capture region to stitch the third and fourth images together to create a larger image. The processor 12 may control the display 24 to display the larger image.

The embodiments of the invention described above enable the processor 12 to align and stitch images together quickly. This is particularly advantageous when the apparatus 20 is a camera in viewfinder or video recording mode, where multiple images are being stitched and displayed every second.

In the example described above in relation to FIG. 6, a previously determined empirical overlapping capture region forms the starting point for determining a further empirical overlapping capture region in block 44 of FIG. 6. Alternatively, the further empirical overlapping capture region could depend upon a previously determined empirical overlapping capture region and a theoretical overlapping capture region (for example, it could be an average of the two).

Alternatively, the overlapping capture region could be or depend upon an average overlapping capture region that has been determined from the analysis of a plurality of sets of images, where each set of images comprises an image captured by the first image sensor portion 21 and an image captured by the second image sensor portion 22.

The processor 12 may be configured to store an empirical overlapping capture region in the overlap data 26 and associate it with a particular temperature or temperature range stored in environment data 28 in the memory 14. The apparatus 20 may also be provided with a temperature sensor and/or a pressure sensor that provide(s) inputs to the processor 12. The processor 12 may be configured to retrieve a previously determined empirical overlapping capture region that corresponds with a sensed temperature and/or a sensed pressure, for use in analyzing images captured by the first and second images sensor portions 21, 22.

The processor 12 may also be configured to store an empirical overlapping capture region in the overlap data 26 and associate it with an operational mode stored in mode data 29 in the memory 14. The stored operational mode may, for example, identify an image resolution, focal length and/or an image stabilization state/position.

When the processor 12 subsequently determines that the apparatus 20 is in a particular operational mode, it may retrieve a previously determined empirical overlapping capture region that corresponds with that operational mode, for use in analyzing images captured by the first and second image sensor portions 21, 22.

References to 'computer-readable storage medium', 'computer program product', 'tangibly embodied computer program' etc. or a 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The blocks illustrated in FIGS. 5 and 6 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, it will be appreciated that it is not necessary for the apparatus 20 to have the configuration illustrated in FIG. 3A or FIGS. 3B to 3D.

It will, of course, be appreciated by those skilled in the art that the explanation of the image sensor portions 21, 22 shown in FIG. 4 is provided merely for illustrative purposes and that, in practice, the number of pixels provided in the first and second image sensor portions 21, 22 may be far greater and may be of the order of millions.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
analyzing first and second images, the first image being captured by a first image sensor portion and the second image being captured by a second image sensor portion, wherein at least one position on the first and second images, at which the analysis of the first and second images is initiated, depends upon at least one contextual characteristic;
determining, from the analysis of the first and second images, an overlapping capture region for the first image portion and the second image portion; and
stitching the first and second images together using the overlapping capture region,
wherein the analysis is performed using data that varies with the at least one contextual characteristic, and
wherein the data is an overlapping capture region for the first image sensor portion and the second image sensor portion that was previously determined by analyzing one or more sets of images, wherein a set of images comprises an image captured by the first image sensor portion and an image captured by the second image sensor portion.

2. A method as claimed in claim 1, wherein the first and second images are captured substantially simultaneously.

3. A method as claimed in claim 2, wherein the first image sensor portion comprises a first set of pixels, the second image sensor portion comprises a second set of pixels, and the overlapping capture region comprises: a subset of the first set of pixels, and a subset of the second set of pixels.

4. A method as claimed in claim 3, wherein the subset of the first set of pixels captured first image content as part of the first image, and the subset of the second set of pixels captured the first image content as part of the second image.

5. A method as claimed in claim 1, wherein the first image sensor portion and the second image sensor portion are separate.

6. A method as claimed in claim 1, wherein the at least one contextual characteristic relates to an operational mode of an apparatus and/or a surrounding environment of an apparatus.

7. A method as claimed in claim 1, wherein the previously determined overlapping capture region is or depends upon an average overlapping capture region determined from an analysis of a plurality of sets of images.

8. A method as claimed in claim 1, wherein the overlapping capture region depends upon a theoretical overlapping capture region for the first image sensor portion and the second image sensor portion.

9. A method as claimed in claim 1, wherein the first and second images are captured using a camera in viewfinder mode or video recording mode.

10. An apparatus comprising:
at least one processor; and
at least one memory storing a computer program comprising instructions configured to, working with the at least one processor, cause the apparatus to perform at least the following:
analyzing first and second images, the first image being captured by a first image sensor portion and the second image being captured by a second image sensor portion, wherein at least one position on the first and second images, at which the analysis of the first and second images is initiated, depends upon at least one contextual characteristic;

determining, from the analysis of the first and second images, an overlapping capture region for the first image sensor portion and the second image sensor portion; and stitching the first and second images together using the overlapping capture region, wherein the analysis is performed using data that varies with the at least one contextual characteristic, and wherein the data is an overlapping capture region for the first image sensor portion and the second image sensor portion that was previously determined by analyzing one or more sets of images, wherein a set of images comprises an image captured by the first image sensor portion and an image captured by the second image sensor portion.

11. An apparatus as claimed in claim 10, wherein the first and second images are captured substantially simultaneously.

12. An apparatus as claimed in claim 10, wherein the first image sensor portion comprises a first set of pixels, the second image sensor portion comprises a second set of pixels, and the overlapping capture region comprises: a subset of the first set of pixels, and a subset of the second set of pixels.

13. An apparatus as claimed in claim 12, wherein the subset of the first set of pixels captured first image content as part of the first image, and the subset of the second set of pixels captured the first image content as part of the second image.

14. An apparatus as claimed in claim 10, wherein the first image sensor portion and the second image sensor portion are separate.

15. An apparatus as claimed in claim 10, wherein the at least one contextual characteristic relates to an operational mode of the apparatus and/or a surrounding environment of the apparatus.

16. An apparatus as claimed in claim 10, wherein the previously determined overlapping capture region is or depends upon an average overlapping capture region determined from an analysis of a plurality of sets of images.

17. An apparatus as claimed in claim 10, wherein the overlapping capture region depends upon a theoretical overlapping capture region for the first image sensor and the second image sensor.

18. An apparatus as claimed in claim 10, wherein the first and second images are captured in viewfinder mode or video recording mode.

19. An apparatus as claimed in claim 10, wherein the apparatus is a camera that comprises the first image sensor and the second image sensor.

20. An apparatus comprising:
means for analyzing first and second images, the first image being captured by a first image sensor portion and the second image being captured by a second image sensor portion, wherein at least one position on the first and second images, at which the analysis of the first and second images is initiated, depends upon at least one contextual characteristic;

means for determining, from the analysis of the first and second images, an overlapping capture region for the first image sensor portion and the second image sensor portion; and means for stitching the first and second images together using the overlapping capture region, wherein the analysis is performed using data that varies with the at least one contextual characteristic, and wherein the data is an overlapping capture region for the first image sensor portion and the second image sensor portion that was previously determined by analyzing one or more sets of images, wherein a set of images comprises an image captured by the first image sensor portion and an image captured by the second image sensor portion.

21. A non-transitory computer readable medium storing a computer program comprising instructions configured to, working with at least one processor, cause at least the following to be performed:

analyzing first and second images, the first image being captured by a first image sensor portion and the second image being captured by a second image sensor portion, wherein at least one position on the first and second images, at which the analysis of the first and second images is initiated depends upon at least one contextual characteristic;

determining, from the analysis of the first and second images, an overlapping capture region for the first image sensor portion and the second image sensor portion; and stitching the first and second images together using the overlapping capture region, wherein the analysis is performed using data that varies with the at least one contextual characteristic, and wherein the data is an overlapping capture region for the first image sensor portion and the second image sensor portion that was previously determined by analyzing one or more sets of images, wherein a set of images comprises an image captured by the first image sensor portion and an image captured by the second image sensor portion.

22. A non-transitory computer readable medium as claimed in claim 21, wherein the first and second images are captured substantially simultaneously.

23. A non-transitory computer readable medium as claimed in claim 21, wherein the first image sensor portion comprises a first set of pixels, the second image sensor portion comprises a second set of pixels, and the overlapping capture region comprises: a subset of the first set of pixels, and a subset of the second set of pixels.

24. A non-transitory computer readable medium as claimed in claim 23, wherein the subset of the first set of pixels captured first image content as part of the first image, and the subset of the second set of pixels captured the first image content as part of the second image.

25. A non-transitory computer readable medium as claimed in claim 21, wherein the first image sensor portion and the second image sensor portion are separate.

26. A non-transitory computer readable medium as claimed in claim 21, wherein the at least one contextual characteristic relates to an operational mode of an apparatus and/or a surrounding environment of an apparatus.

27. A non-transitory computer readable medium as claimed in claim 21, wherein the previously determined overlapping capture region is or depends upon an average overlapping capture region determined from an analysis of a plurality of sets of images.

28. A non-transitory computer readable medium as claimed in claim 21, wherein the overlapping capture region depends upon a theoretical overlapping capture region for the first image sensor portion and the second image sensor portion.

29. A method comprising:
analyzing one or more sets of images, wherein a set of images comprises a first image captured by a first image sensor portion and a second image captured by a second image sensor portion;
determining, from the analysis, an overlapping capture region for the first image sensor portion and the second image sensor portion;
analyzing third and fourth images in dependence upon the overlapping capture region determined from the analysis of the one or more sets of images, the third image being captured by the first image sensor portion and the fourth image being captured by the second image sensor portion;
determining, from the analysis of the third and fourth images, a further overlapping capture region for the first image sensor portion and the second image sensor portion; and
stitching the third and fourth images together using the further overlapping capture region.

30. An apparatus comprising:
means for analyzing one or more sets of images, wherein a set of images comprises a first image captured by a first image sensor portion and a second image captured by a second image sensor portion;
means for determining, from the analysis, an overlapping capture region for the first image sensor portion and the second image sensor portion;
means for analyzing third and fourth images in dependence upon the overlapping capture region determined from the analysis of the one or more sets of images, the third image being captured by the first image sensor portion and the fourth image being captured by the second image sensor portion;
means for determining, from the analysis of the third and fourth images, a further overlapping capture region for the first image sensor portion and the second image sensor portion; and
means for stitching the third and fourth images together using the further overlapping capture region.

31. An apparatus comprising:
at least one processor; and
at least one memory storing a computer program comprising instructions configured to, working with the at least one processor, cause the apparatus to perform at least the following:
analyzing one or more sets of images, wherein a set of images comprises a first image captured by a first image sensor portion and a second image captured by a second image sensor portion;
determining, from the analysis, an overlapping capture region for the first image sensor portion and the second image sensor portion;
analyzing third and fourth images in dependence upon the overlapping capture region determined from the analysis of the one or more sets of images, the third image being captured by the first image sensor portion and the fourth image being captured by the second image sensor portion;
determining, from the analysis of the third and fourth images, a further overlapping capture region for the first image sensor portion and the second image sensor portion; and
stitching the third and fourth images together using the further overlapping capture region.

32. A non-transitory computer readable medium storing a computer program comprising instructions configured to, working with at least one processor, cause at least the following to be performed:
analyzing one or more sets of images, wherein a set of images comprises a first image captured by a first image sensor portion and a second image captured by a second image sensor portion;
determining, from the analysis, an overlapping capture region for the first image sensor portion and the second image sensor portion;
analyzing third and fourth images in dependence upon the overlapping capture region determined from the analysis of the one or more sets of images, the third image being captured by the first image sensor portion and the fourth image being captured by the second image sensor portion;
determining, from the analysis of the third and fourth images, a further overlapping capture region for the first image sensor portion and the second image sensor portion; and
stitching the third and fourth images together using the further overlapping capture region.

33. A method comprising:
analyzing first and second images, the first image being captured by a first image sensor portion and the second image being captured by a second image sensor portion;
determining, from the analysis of the first and second images, an overlapping capture region for the first image portion and the second image portion; and
stitching the first and second images together using the overlapping capture region,
wherein the overlapping capture region depends upon a theoretical overlapping capture region for the first image sensor portion and the second image sensor portion.

34. An apparatus comprising:
at least one processor; and
at least one memory storing a computer program comprising instructions configured to, working with the at least one processor, cause the apparatus to perform at least the following:
analyzing first and second images, the first image being captured by a first image sensor portion and the second image being captured by a second image sensor portion;
determining, from the analysis of the first and second images, an overlapping capture region for the first image sensor portion and the second image sensor portion; and
stitching the first and second images together using the overlapping capture region,
wherein the overlapping capture region depends upon a theoretical overlapping capture region for the first image sensor and the second image sensor.

35. An apparatus comprising:
means for analyzing first and second images, the first image being captured by a first image sensor portion and the second image being captured by a second image sensor portion;
means for determining, from the analysis of the first and second images, an overlapping capture region for the first image sensor portion and the second image sensor portion; and
means for stitching the first and second images together using the overlapping capture region,
wherein the overlapping capture region depends upon a theoretical overlapping capture region for the first image sensor portion and the second image sensor portion.

36. A non-transitory computer readable medium storing a computer program comprising instructions configured to, working with at least one processor, cause at least the following to be performed:
- analyzing first and second images, the first image being captured by a first image sensor portion and the second image being captured by a second image sensor portion;
- determining, from the analysis of the first and second images, an overlapping capture region for the first image sensor portion and the second image sensor portion; and
- stitching the first and second images together using the overlapping capture region,
- wherein the overlapping capture region depends upon a theoretical overlapping capture region for the first image sensor portion and the second image sensor portion.

* * * * *